US005907970A

United States Patent [19]

Havlovick et al.

[11] Patent Number: 5,907,970

[45] Date of Patent: Jun. 1, 1999

[54] TAKE-OFF POWER PACKAGE SYSTEM

[76] Inventors: Bradley J. Havlovick, 973 Lowell Dr., Idaho Falls, Id. 83402; Terrance A. Toomey, 16676 Pinewood Trail Rd. NE., Newark, Ohio 43055

[21] Appl. No.: 08/950,943

[22] Filed: Oct. 15, 1997

[51] Int. Cl.[6] .......... F16M 37/00; F16H 57/02

[52] U.S. Cl. .......... 74/16; 74/606 R; 403/3; 403/13; 464/93

[58] Field of Search .......... 74/16, 606 R; 403/3, 13; 285/12, 311; 464/92, 93

[56] References Cited

U.S. PATENT DOCUMENTS

| | | | |
|---|---|---|---|
| 969,160 | 9/1910 | Hardy | 285/311 |
| 2,361,768 | 10/1944 | Heintz et al. | 74/16 |
| 2,727,395 | 12/1955 | White | 74/16 |
| 2,795,958 | 6/1957 | Frank | 74/16 |
| 2,975,644 | 3/1961 | Graybill | 74/16 |
| 3,340,741 | 9/1967 | Pietro | 74/15.63 |
| 3,603,162 | 9/1971 | Gohler | 74/16 |
| 3,610,781 | 10/1971 | Kolb et al. | 464/93 X |
| 3,626,767 | 12/1971 | Wildi | 74/16 |
| 4,269,075 | 5/1981 | Crist et al. | 74/16 |
| 4,729,353 | 3/1988 | Streng | 123/195 A |
| 4,757,786 | 7/1988 | Ellegard | 123/2 |
| 4,989,323 | 2/1991 | Casper et al. | 30/296.1 |
| 4,992,669 | 2/1991 | Parmley | 290/1 R |
| 5,526,708 | 6/1996 | Hill | 74/16 |
| 5,697,249 | 12/1997 | Miguchi | 74/16 |

FOREIGN PATENT DOCUMENTS

| | | |
|---|---|---|
| 447271 | 3/1948 | Canada . |
| 2 072 093 | 9/1981 | United Kingdom . |

OTHER PUBLICATIONS

Product Engineering; "Engine Snaps Onto Choice of Implements"; pp. 68 & 69, Nov. 7, 1960.

*Primary Examiner*—Allan D. Herrmann
*Attorney, Agent, or Firm*—Richard C. Litman

[57] ABSTRACT

A take-off power package system (TOPPS) designed to allow a number of tool packages to be quickly and positively connected to a prime mover package. The prime mover package comprises an internal combustion engine (ICE) which is mounted to a lightweight, tubular steel or aluminum frame. A flexible, quick-connect coupling is mounted directly to the engine crankshaft for mating with a coupling on the drive shaft of a selected driven tool package. Two clamps, and a plate and pin alignment system are provided on the drive shaft side of the frame for positively securing the selected tool package to the prime mover package. An auxiliary fuel tank may also be mounted to the prime mover package to extend the operating time of the engine. The tool packages house a number of shaft driven implements, including hydraulic pumps, electric generators, air compressors, etc. As with the prime mover package, the tool packages also include a lightweight, tubular steel or aluminum frame for mounting the particular implement. A flexible, quick-connect coupling is mounted on the input shaft of these packages for quick connection to the mating coupling on the engine crankshaft. Two latches and a plate and bore alignment system are provided on the input shaft side of the frame of the tool package for connection to the clamps and plate and pin alignment system of the prime mover package.

2 Claims, 5 Drawing Sheets

TAKE-OFF POWER PACKAGE SYSTEM

BACKGROUND OF THE INVENTION

1. Field of the Invention

The present invention relates to a portable, internal combustion engine powered, take-off power package system (TOPPS) and, more specifically, to a power drive system including a power drive package that is used to drive a plurality of detachable, packaged, driven units such as hydraulic pumps, electric generators, air compressors, etc.

2. Description of the Related Art

Portable, self contained tools presently on the market include a prime mover permanently attached to a specific tool. While these devices provide useful features in environments where electrical power is not available, they are limited in versatility due to each tool requiring its own prime mover (usually an internal combustion engine, ICE). To increase the versatility of these tools, systems have been designed that include a prime mover separately mounted to a power drive unit, and a number of modular tools that may be selectively connected to the power drive unit. These systems allow a single prime mover to be used with a plurality of tools, thus reducing the overall cost while providing an extensive range of power tools and associated functions. Unfortunately, these systems have modules that are either both difficult and time consuming to connect, or allow unacceptable freedom of movement between the prime mover and the associated driven module.

Exemplary, related art will now be discussed. U.S. Pat. No. 3,340,741, issued to Pietro on Sep. 12, 1967, discloses a power take-off connection for the driving shaft of an internal combustion engine. No details concerning other connections to the engine are disclosed, however. U.S. Pat. No. 4,729,353, issued to Streng on Mar. 8, 1988, discloses a fuel container support system for a combustion engine within a support frame. External connections to the drive shaft or other sections of the frame are not discussed. U.S. Pat. No. 4,757,786, issued to Ellegard on Jul. 19, 1988, discloses a releasable engine coupling arrangement for use between an ICE and a power tool. The coupling arrangement, however, allows a large amount of free movement between the shafts, as well as being suited only for smaller hand-held tools. U.S. Pat. No. 4,989,323, issued to Casper et al. on Feb. 5, 1991, discloses a portable power unit for various power tools. As this device is for smaller tools, there are no frames used for the various tools or the ICE.

U.S. Pat. No. 4,992,669, issued to Parmley on Feb. 12, 1991, discloses a modular energy system wherein a driving unit that includes a power plant may be selectively connected to driven units via a drive shaft. Due to the large size and weight of the units, there is apparently no need for a solid connection between the units. Canadian Patent No. 447,271, issued on Mar. 16, 1948, discloses portable engines used for powering a variety of power tools via a flexible shaft. No connection to the engine housing is disclosed. British Pat. Application No. 2,072,093, published Sep. 30, 1981, discloses a method of coupling an internal combustion engine (ICE) to an implement using a centering ring, a centering part, and plug-in coupling parts for the drive shaft. As the connection between the engine and the implement is semi-permanent, no quick release mechanism is used.

None of the above inventions and patents, taken either singularly or in combination, is seen to describe the instant invention as claimed. Thus a take-off power package system solving the aforementioned problems is desired.

SUMMARY OF THE INVENTION

The take-off power package system of the present invention is designed to allow a number of tool packages to be quickly and positively connected to a prime mover package. The prime mover package comprises an internal combustion engine (ICE) which is mounted to a lightweight, tubular steel or aluminum frame, with aluminum being the preferred metal due to weight considerations. The ICE is usually in the range of 5–30 HP; any size engine, however, could be used, keeping in mind that portability is a prime concern of the present invention. For extended run situations, an auxiliary fuel tank may also be mounted to the prime mover package to extend the operating time of the engine. While the preferred embodiment of the frame is constructed using cylindrical tubes, the frame could alternatively be constructed using square tubing. When an aluminum frame is used, it has been found that an ICE as large as 30 HP can be used and still allow the prime mover package to be carried by a single person.

A flexible, quick-connect coupling is mounted directly to the engine crankshaft for mating with a coupling on the drive shaft of a selected driven tool package. The shaft end of the prime mover package includes a plate and pin alignment structure mounted thereto. This plate and pin alignment structure includes a plate mounted to the frame of the prime mover package. The plate includes a centrally located aperture through which the shafts of the prime mover and tool extend. Two alignment pins are mounted on the outward surface of the plate. The top of the plate includes a guide centrally mounted thereto. For attachment of the prime mover package to the desired tool package, two clamps are provided on opposite sides of the prime mover package.

The tool packages of the present invention house a number of shaft driven implements including, but not limited to: a de-watering pump; a mid-range pump; a firepump; a high pressure pump; a hydraulic pump; an electric generator; a welding machine; an air compressor; an air mover; and a variable ratio transmission. Of course, any suitably sized shaft driven tool may be mounted in a tool package. As with the prime mover package, the tool packages also include a lightweight, tubular steel or aluminum frame for mounting the particular implement. A flexible, quick-connect coupling is mounted on the input shaft of the tool packages for quick connection to the mating coupling on the engine crankshaft.

To mate with the plate and pin alignment structure of the prime mover package, the shaft end of the tool packages includes a plate and bore alignment structure mounted thereto. The plate and bore alignment structure includes a plate mounted to the frame of the tool package. The plate on the tool package includes a centrally located aperture through which the shafts of the prime mover and tool extend, as well as two alignment bores that extend therethrough. These bores align with and accept the pins located on the plate of the prime mover package. Each tool package also includes two latches mounted on opposite sides of the shaft end of the tool package. When the prime mover package is attached to a tool package, the clamps engage the latches. The plate, pin and bore alignment structures discussed above ensure that the driving shaft of the prime mover is aligned with the driven shaft of the associated tool, as well as inhibiting rotational movement between the two packages.

Accordingly, it is a principal object of the invention to provide a modular power tool drive system wherein tool packages can be quickly and positively connected to a prime mover package.

It is another object of the invention to provide a power tool drive system that is lightweight and portable.

It is a further object of the invention to reduce the amount of free play between the crankshaft of an internal combustion engine and the input shaft of a tool.

It is an object of the invention to provide improved elements and arrangements thereof in a modular power tool drive system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
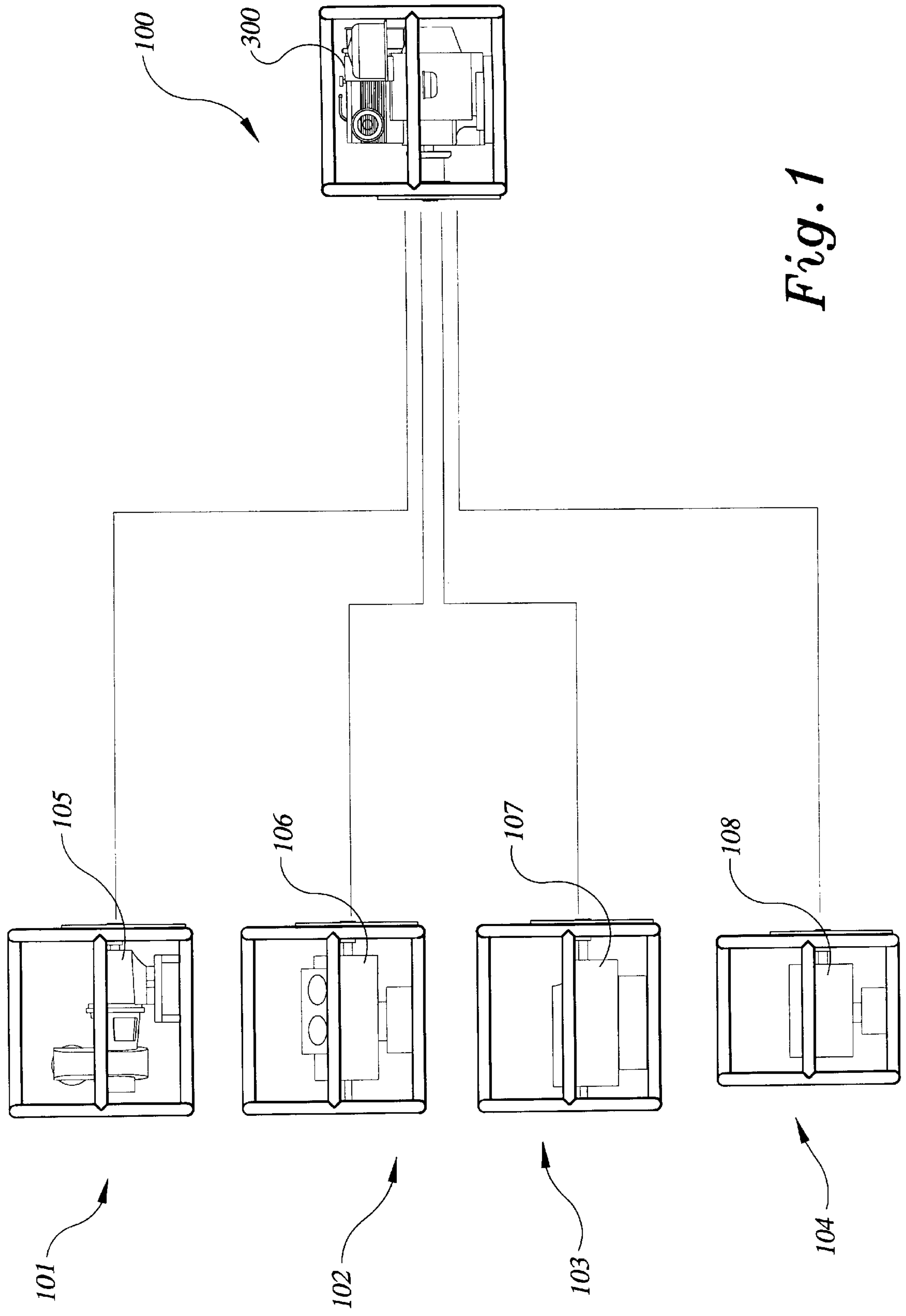
FIG. 1 is an environmental, largely schematic view of a take-off power package system according to the present invention.

The present invention is a take-off power package system as shown in FIG. 1, having a prime mover package 100 and four exemplary tool packages 101, 102, 103 and 104. Each of the tool packages includes a shaft driven tool 105, 106, 107 and 108, that is operated by the output shaft of the prime mover package when the tool package is attached to the prime mover package. The shaft driven tools represented by 105–108 include but are not necessarily limited to: a de-watering pump; a mid-range pump; a firepump; a high pressure pump; a hydraulic pump; an electric generator; a welding machine; an air compressor; an air mover; and a variable ratio transmission. Of course, any suitably sized shaft driven tool may be mounted in a tool package.

Figure 2:
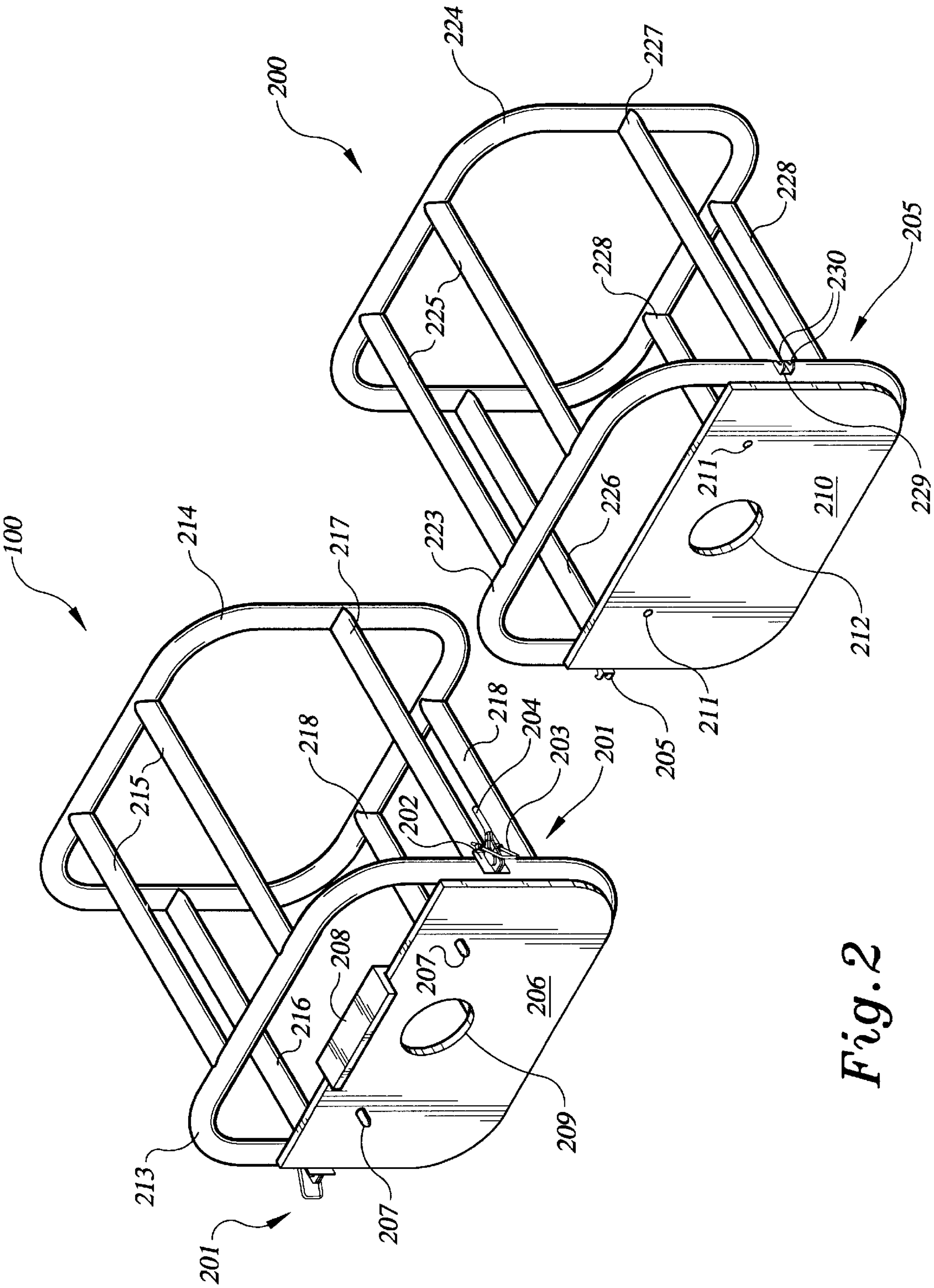
FIG. 2 is an isometric view of the prime mover package and an exemplary tool package with the prime mover and tool removed for clarity.
Figure 3:
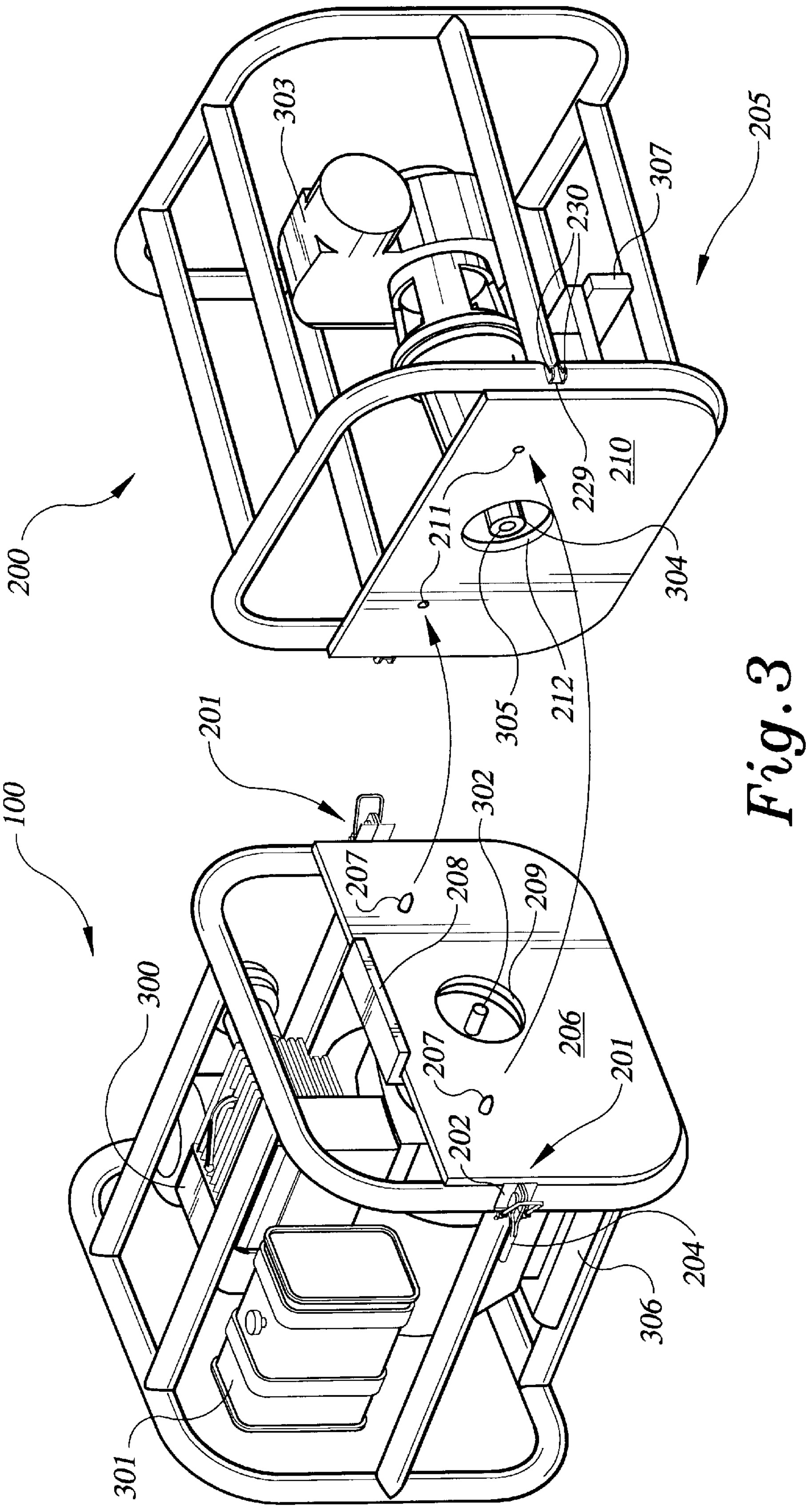
FIG. 3 is an isometric view of the prime mover package and exemplary tool package showing the interconnections therebetween.
Figure 4:
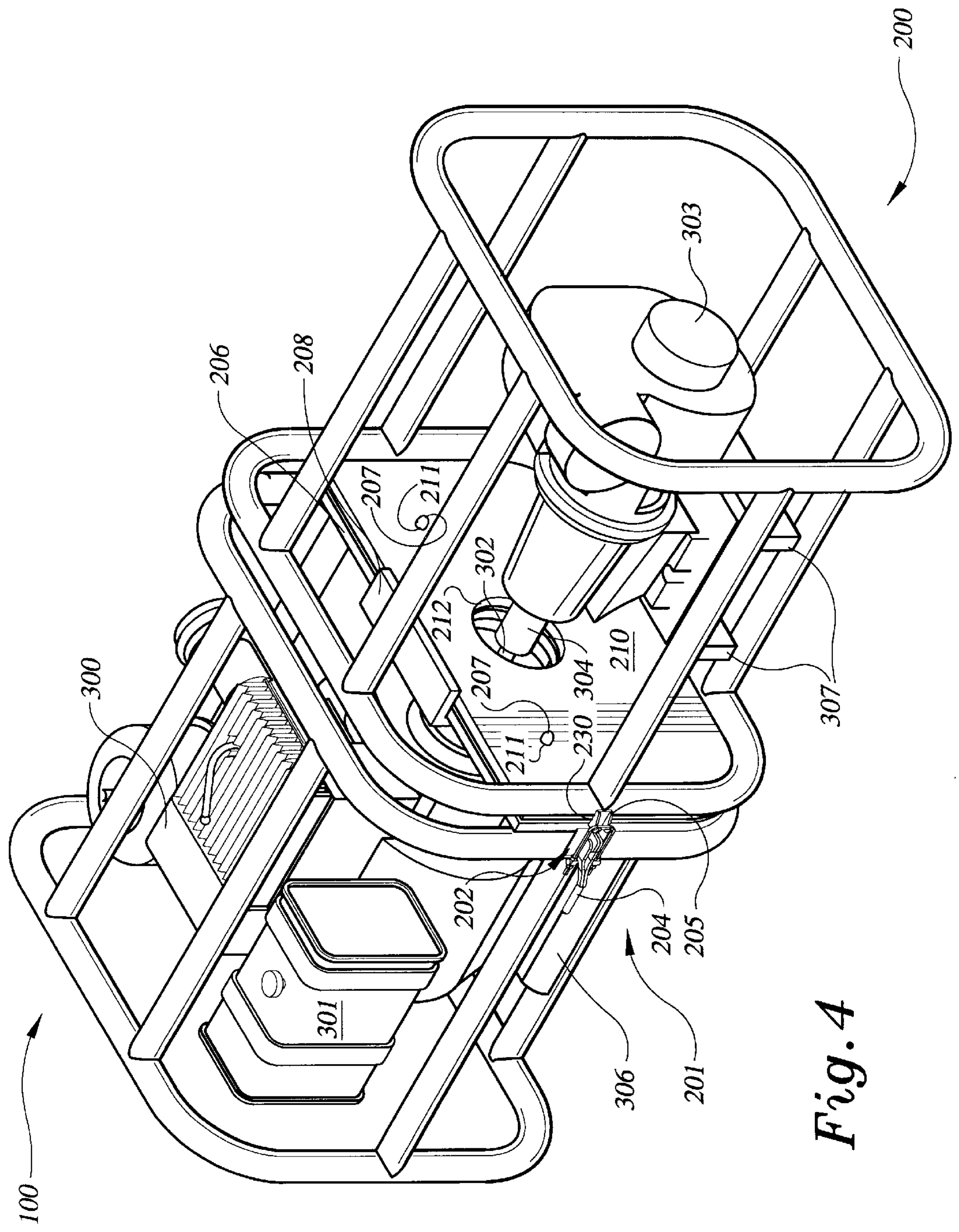
FIG. 4 is an isometric view of the prime mover package and exemplary tool package attached to each other.

The details of the present invention are better seen in FIGS. 2–4. The prime mover package 100 includes a prime mover which is usually an internal combustion engine ICE 300 (thereby allowing operation at remote locations where electric power may not be available). The ICE 300 is usually in the range of 5–30 HP; any size engine, however, could be used keeping in mind that weight minimization and portability are prime concerns of the present invention. A frame for supporting the prime mover is constructed of tubular steel or aluminum, with aluminum being the preferred metal due to weight considerations. When an aluminum frame is used, it has been found that an ICE as large as 30 HP can be used and still allow the prime mover package to be carried by a single person.

As can best be seen in FIGS. 2 and 3, the frame for the prime mover package 100 includes a first, shaft end 213 constructed of two vertical tubes and two horizontal tubes to form a substantially rectangular structure. A second, opposite end 214 is constructed in a similar manner. It should be noted that the number, size and relative proportions of the vertical and horizontal tubes can be matched to accommodate whatever size and type of prime mover is mounted inside the prime mover package 100. The two ends of the prime mover package 100 are attached to each other by a number of horizontal tubes including: a first side tube 216; a second side tube 217; two top tubes 215; and two bottom tubes 218.

The frame for the tool package 200 is constructed in a manner similar to the prime mover package and includes a first, shaft end 223 constructed of two vertical tubes and two horizontal tubes to form a substantially rectangular structure. A second, opposite end 224 is constructed in a similar manner. As with the prime mover frame, it should be noted that the size and relative proportions of the vertical and horizontal tubes can be matched to accommodate whatever size and type of tool is mounted inside the tool package 200. The two ends of the tool package 200 are attached to each other by a number of horizontal tubes including: a first side tube 226; a second side tube 227; two top tubes 225; and two bottom tubes 228. While the preferred embodiment is constructed using cylindrical tubes (as shown in the drawings), the frames 100 and 200 could alternatively be constructed using square tubing. The material of the tubes is preferably lightweight aluminum; however, any suitable metal may be used (steel, stainless steel, etc.) keeping strength and portability in mind. Additionally, it should be noted that the number of horizontal tubes connecting the ends of frames 100 and 200 would be minimized, (to reduce weight) but matched to accommodate whatever size and type of tool or prime mover is mounted within the packages. In smaller packages, the side tubes, top tubes and bottom tubes, could be replaced with the minimum number of tubes needed to support the prime mover or tool. The location of these tubes would be determined considering overall strength and torque requirements, and the tubes could be located on the sides, or on the top and bottom of the frame.

The shaft end 213 of the prime mover package 100 includes a plate and pin alignment structure mounted thereto. This plate and pin alignment structure includes a plate 206 mounted to the lower horizontal and the vertical tubes of the shaft end 213 of the prime mover package 100. Plate 206 includes a centrally located aperture 209 through which the shafts of the prime mover and tool extend. Two alignment pins 207 are mounted on the external surface of plate 206, one on each side of aperture 209 equidistantly spaced therefrom. The top of plate 206 also includes a guide 208 having an L-shaped cross section that is centrally mounted to plate 206.

To mate with the plate and pin alignment structure of the prime mover package, the shaft end 223 of the tool package 200 includes a plate and bore alignment assembly mounted thereto. This plate and bore alignment structure includes a plate 210 mounted to the lower horizontal and the vertical tubes of the shaft end 223 of the tool package 200. Plate 210 has a centrally located aperture 212 through which the shafts of the prime mover and tool extend. Two alignment bores 211 are mounted on the external surface of plate 210, one on each side of aperture 212. These bores 211 align with and accept pins 207 when the tool package 200 is attached to the prime mover package 100.

For attachment of the prime mover package 100 to the desired tool package, two clamps 201 are provided on opposite sides of the prime mover package 100. These clamps (along with their matching latch plates 205) are available in the marketplace, and one such clamp is manufactured by De-Sta-Co as model 323, model 331 and model 341 (depending on the size). The clamps 201 include a mounting plate 202 that is attached to an outer portion of the vertical tubes of the shaft end 213 of the prime mover frame. A threaded U-bolt 203 acts as a latch engaging bar, and is attached via a pivot to a handle 204. The clamps lock in the latched position due to an over-center toggle action. Each tool package 200 includes two latches 205 mounted on opposite sides to the shaft end 223 of the tool package 200. The latches 205 include a central mounting plate 229 attached to an outer portion of the vertical tubes of the shaft end 223 of the tool frame. Two latch hooks 230 extend at right angles from the top and bottom of the mounting plate 229.

When it is desired to attach the prime mover package 100 to the tool package 200, the prime mover package 100 is lifted and carried to a position wherein the plate 206 faces the plate 210 of the tool package 200. The shaft end of the prime mover package 100 is lifted until guide 208 is resting on top of plate 210. With guide 208 supporting the vertical position of plate 206 with respect to plate 210, the fronts of the packages can easily be slid horizontally with respect to each other until pins 207 align with bores 211. The distal ends of the pins 207 are rounded, thereby easing their entry into bores 211. It should be noted that the distances from the top of the plates to the pins, bores and shafts of the tool and prime mover, are calibrated to ensure alignment of the pins, bores, apertures 209 and 212 (and the tool and prime mover shafts), and the clamps 201 and latches 205. Once the pins 207 align with the bores 211, it is an easy matter to slide the packages closer to each other until plate 206 is flush with plate 210. Bores 211 extend all the way through plate 210, so that the length of pins 207 is not critical as long as they extend into the bores 211 enough to provide a tight relationship. To this end the outer diameter of the pins 207 is closely sized to the internal diameter of the bores 211.

Having aligned the packages with each other, clamps 201 are attached to latches 205. Each of the clamps 201 includes a threaded U-bolt 203 that acts as a latch engaging bar. The latch engaging bar 203 is guided over the latch hooks 230 on the latches 205. Handle 204 is then pushed toward the side tube 217 and the clamp locks in the latched position due to an over-center toggle action. Once the clamps 201 are locked in the latched position, nuts located on the threaded U-bolt can be tightened to ensure a snug fit. Note that once these nuts are adjusted, they need not be readjusted assuming the relative locations of the pins, bores, clamps and latches on the prime mover and tool packages have not changed.

Turning to FIG. 3, the prime mover 300 (ICE) includes an auxiliary gas tank 301 for extended run time. Output or driving shaft 302 is an extension of the crankshaft of ICE 300, and is normally splined for a friction fit within the bore 305 of flexible coupling 304. The flexible coupling 304, is mounted onto the input or driven shaft of tool 303, (shown here as a hydraulic pump). The plate, pin and bore alignment structure discussed above ensures that shaft 302 is aligned with bore 305. The flexible coupling 304 is shown here generically, with the details of the coupling being discussed below. The prime mover 300 includes a base 306 that is bolted or otherwise attached to the bottom tubes of the prime mover package frame. Likewise the tool 303 also includes a base 307 that is bolted or otherwise attached to the bottom tubes of the tool package frame. The plate, pin and bore alignment structure along with the clamps and latches inhibit rotational movement between the two packages.

Figure 5:
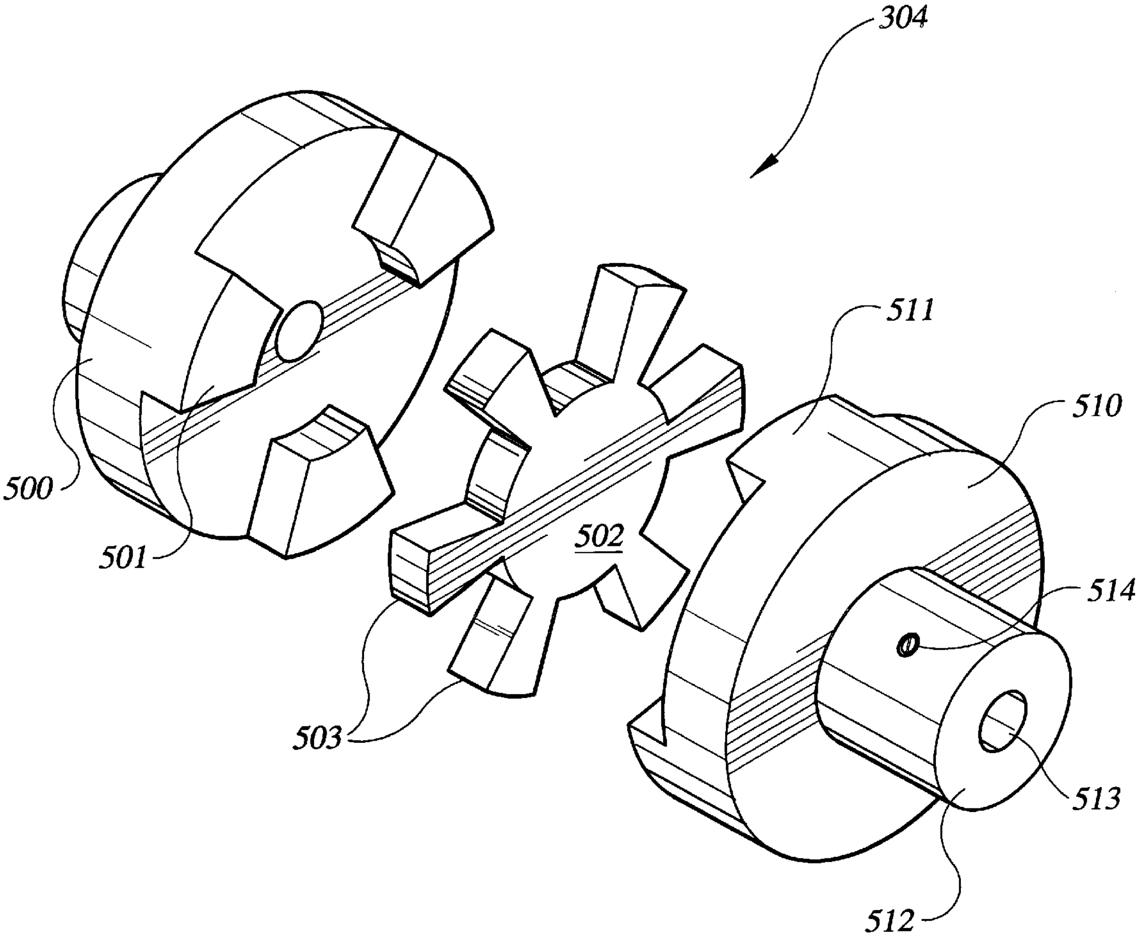
FIG. 5 is an enlarged scale, isometric view of a prior art flexible coupling used in the present invention.

FIG. 5 discloses the details of a preferred embodiment of the flexible quick-connect coupling 304. The flexible quick-connect coupling 304 includes a first half 500 mounted to the driving shaft 302 of the prime mover and a second half 510 mounted to the driven shaft of the tool. First half 500 and second half 510 are identical, and include a cylindrical extension 512. A bore 513 extends through both halves for accepting their associated shaft. A set screw 514 is provided to securely clamp the coupling halves to the shafts. Note that set screw 514 is shown here with a slot for accepting a standard screwdriver; however, an Allen head wrench or Phillips driver may be used with the screw head being modified for use with such.

Each half includes three raised portions 511 spaced 120° apart. An elastomeric element 502 is operably mounted between the first and second halves, and includes a number of radially extending portions 503 that are interposed between the raised portions 511 of the coupling halves. This flexible quick-connect coupling 304, is available commercially, and no further explanation is deemed necessary. It should be noted, however, that this type of coupling allows some freedom of movement, to make up for any slight misalignment between the packages.

It is to be understood that the present invention is not limited to the embodiment described above, but encompasses any and all embodiments within the scope of the following claims.

We claim:

1. A take-off power package system comprising:

a) a prime mover package including: a prime mover; a frame for supporting said prime mover; a clamping means having a first mounting plate attached to said frame for supporting said prime mover; a handle; a pivot and a latch engaging bar; a driving shaft; and a plate and pin alignment means including a first plate mounted to a shaft end of said frame for supporting said prime mover, and two pins mounted on an external surface of said first plate;

b) a tool package including: a shaft driven tool to be driven by said prime mover; a frame for supporting said tool; a latching means including a second mounting plate attached to said frame for supporting said tool and at least one latch hook; a driven shaft; and a plate and bore alignment means including a second plate mounted to a shaft end of said frame for supporting said tool, and two bores extending through said second plate; and c) a flexible quick-connect coupling having a first half mounted to said driving shaft, a second half mounted to said driven shaft and an elastomeric element operably mounted between said first half and said second half; and wherein d) a latch engaging said at least one latch hook to securely attach said frame for supporting said prime mover, to said frame for supporting said tool, when said handle is moved to an over center clamping position;

e) said pins extend into said bores to restrict relative rotational movement between said prime mover package and said tool package when said latch engages said at least one latch hook; and f) said frame for supporting said prime mover and said frame for supporting said tool both comprise a first end including two first vertical tubes and two first horizontal tubes, a second end including two second vertical tubes and two second horizontal tubes, a first side including at least one third horizontal tube, a second side including at least one fourth horizontal tube, a top including at least one fifth horizontal tube and a bottom including at least one sixth horizontal tube, all of said tubes being constructed of lightweight aluminum.

2. The take-off power package system as defined in claim 1 wherein:

said prime mover is an internal combustion engine ICE; and said tool is one of a de-watering pump, a mid-range pump, a firepump, a high pressure pump, a hydraulic pump, an electric generator, a welding machine, an air compressor, an air mover and a variable ratio transmission.

* * * * *